Dec. 27, 1955 C. C. ROSS 2,728,192
COMBUSTION CHAMBER FOR GAS GENERATION PROVIDED WITH
COOLING MEANS AND A SYSTEM FOR OPERATING THE SAME
Filed June 20, 1945 4 Sheets-Sheet 1

INVENTOR.
CHANDLER C. ROSS
BY
Christie & Angus
ATTORNEYS

Dec. 27, 1955 C. C. ROSS 2,728,192
COMBUSTION CHAMBER FOR GAS GENERATION PROVIDED WITH
COOLING MEANS AND A SYSTEM FOR OPERATING THE SAME
Filed June 20, 1945 4 Sheets-Sheet 2

INVENTOR.
CHANDLER C. ROSS
BY Christie & Angus
ATTORNEYS

Dec. 27, 1955   C. C. ROSS   2,728,192
COMBUSTION CHAMBER FOR GAS GENERATION PROVIDED WITH
COOLING MEANS AND A SYSTEM FOR OPERATING THE SAME
Filed June 20, 1945   4 Sheets-Sheet 3

INVENTOR.
CHANDLER C. ROSS
BY
Christie & Angus
ATTORNEYS

United States Patent Office 2,728,192
Patented Dec. 27, 1955

2,728,192

COMBUSTION CHAMBER FOR GAS GENERATION PROVIDED WITH COOLING MEANS AND A SYSTEM FOR OPERATING THE SAME

Chandler C. Ross, Pasadena, Calif., assignor, by mesne assignments, to Aerojet-General Corporation, Cincinnati, Ohio, a corporation of Ohio Application June 20, 1945, Serial No. 600,590

4 Claims. (Cl. 60—39.14)

This invention relates to combustion chambers and more particularly to combustion chambers of the type adapted for the production of gases under pressure with provision for delivery of the gas in the form of a high velocity jet to perform useful work. My combustion chamber is applicable for use in driving gas turbines and the like.

The principal object of my invention is to provide a combustion chamber arrangement adapted for the efficient delivery of the gases in a useful manner and under easy operating conditions.

It is a common practice to drive a gas turbine by delivering against the rotor blades of the turbine a gas jet or jets exhausted at high velocity from a combustion chamber wherein the gases are formed by the combustion of fuels introduced into the chamber. The high temperatures attending the combustion of the fuel have frequently imposed disadvantages and undesired limitations which can be avoided if the temperatures can be reduced. The high temperatures heretofore encountered have, for example, prevented the use of some materials in the construction of the turbine wheels or gas chambers, which might otherwise be desirable for use if the temperatures were lower.

According to my invention I overcome the foregoing disadvantages of the high temperature gas jets by providing arrangement of the combustion chamber wherein the gas jet is delivered from the chamber at a lower temperature than has heretofore usually been obtainable while at the same time avoiding other disadvantages which have usually accompanied attempts on reduced gas temperature.

I carry out my invention by use of a combustion chamber containing a constricted portion between two or more enlarged portions, and at the restricted portion I introduce a cooling fluid which vaporizes by contact with the gas issuing through the constriction, thereby reducing the temperature of the gas. By this arrangement I am able to introduce fuel into one of the enlarged portions or compartments of the device and cause it to burn or decompose there to produce the desired gas. The gas thus formed issues through the constricted portion. Owing to the high velocity at the constriction it carries the cooling fluid which may for example be water, and evenly disperses it throughout the volume of issuing gas into the second portion or compartment of the device. Thus a homogeneous cooled gas mixture exists in this second compartment whence it may be caused to pass through an exhaust nozzle from the device in the form of a homogeneous effective gas jet of relatively low temperature.

The above and other features of my invention are more clearly set forth in the following detailed description and accompanying drawings in which:

Fig. 8 is a cross section view showing the profile of a nozzle; and

Figure 1:
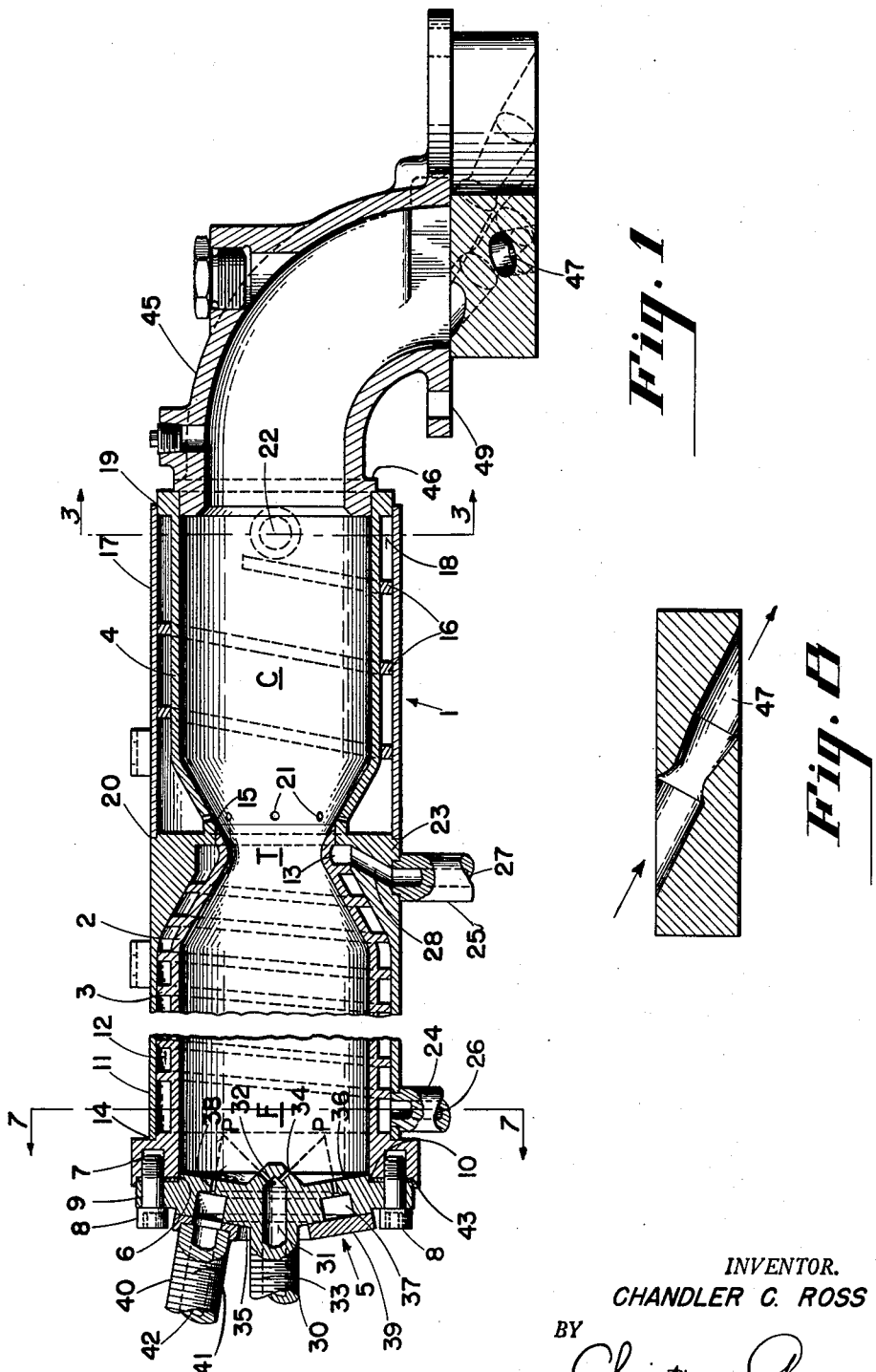
Fig. 1 is a longitudinal cross section view of the combustion apparatus showing the relationship of the firing chamber, cooling chamber and nozzle assembly.
Figure 2:
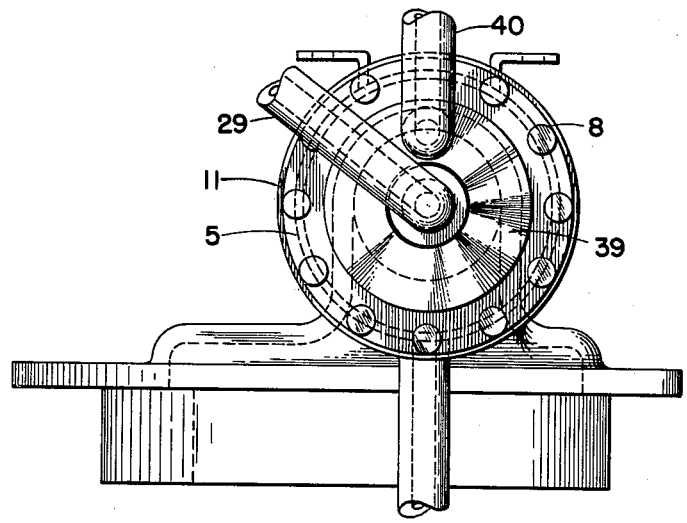
Fig. 2 is an end view taken at the left hand side of Fig. 1.
Figure 3:
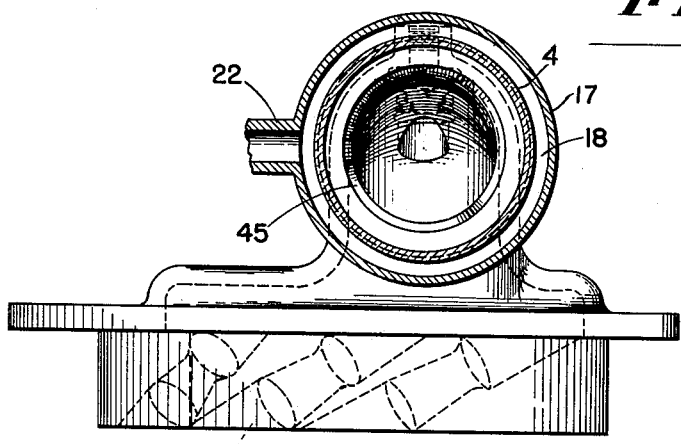
Fig. 3 is a view partly in cross section taken on the line 3—3 of Fig. 1.
Figure 4:
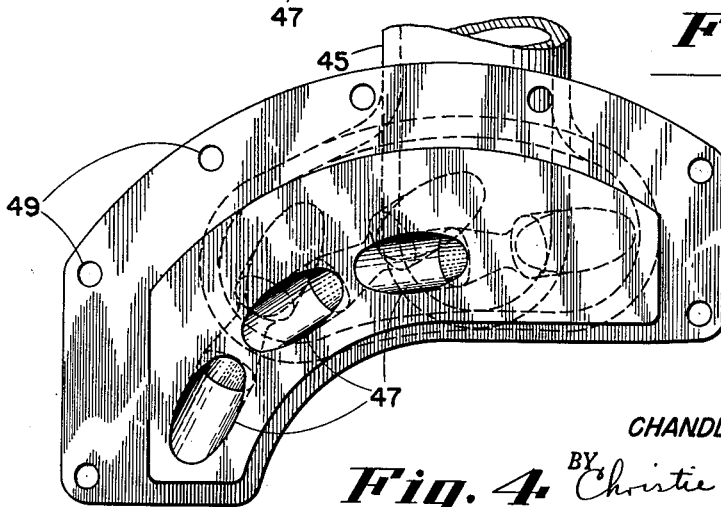
Fig. 4 is a view taken on the face of the discharge nozzle shown at the right hand side of Fig. 1.
Figure 5:
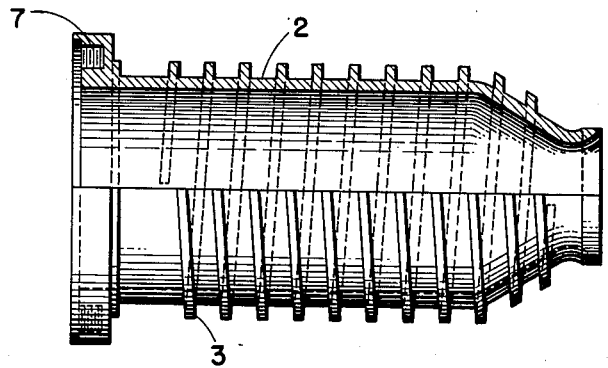
Fig. 5 is a view partly in cross section showing the inner wall of the firing chamber and the cooling vanes.
Figure 6:
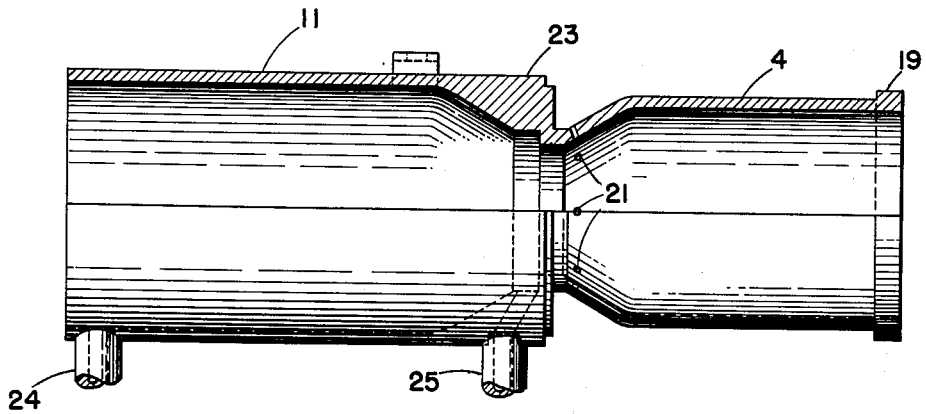
Fig. 6 is a view partly in cross section showing the outer firing chamber cover to which the inner cooling chamber shell is integrally attached.
Figure 7:
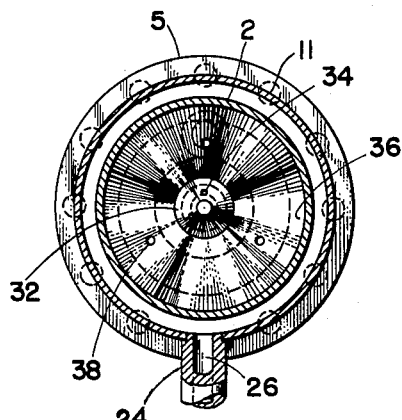
Fig. 7 is a view taken on the line 7—7 of Fig. 1.
Figure 9:
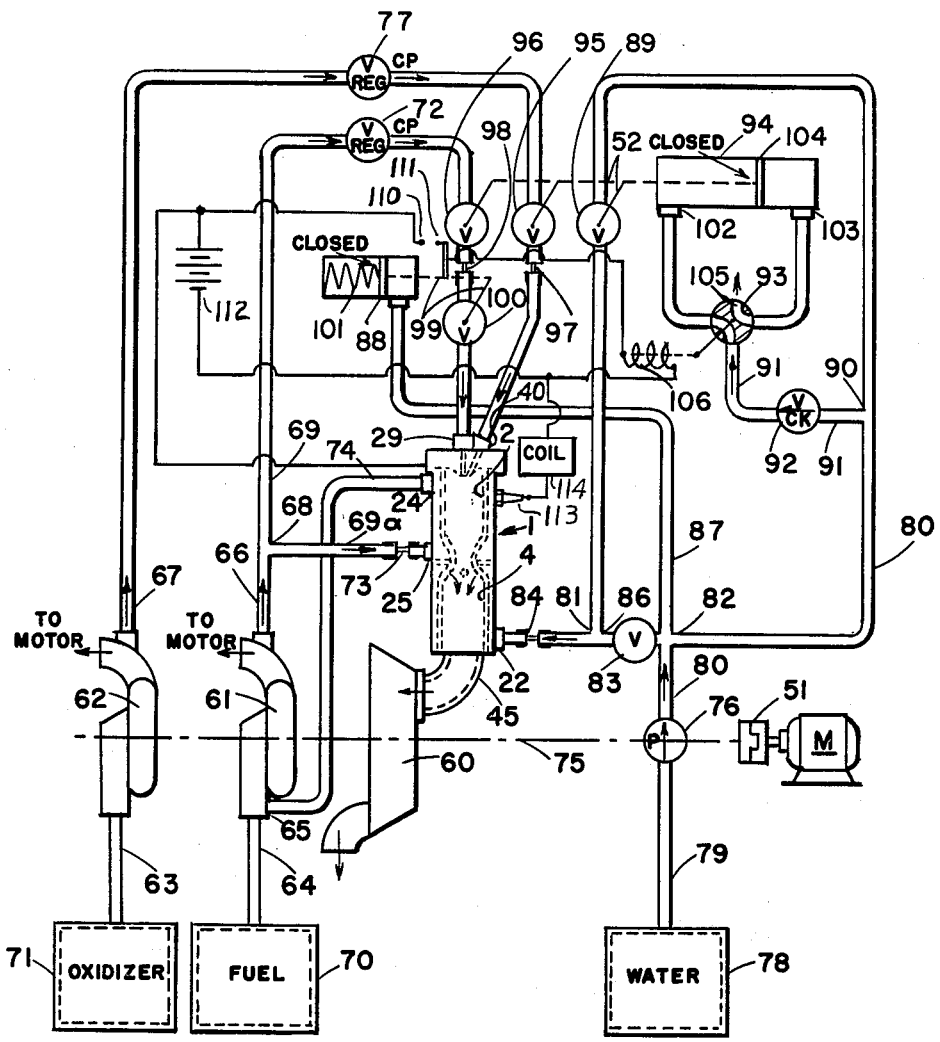

Fig. 9 schematically shows the relationship of the combustion apparatus to the turbine, pumps and control system.

The particular embodiment described is adapted for use with a liquid fuel and oxidizer. The fuel may be, for example, aniline and the oxidizer red fuming nitric acid. The firing chamber F is part of an assembly 1 which comprises an inner wall 2 preferably cylindrical in shape for about half the length of the firing chamber assembly 1. This firing chamber starts to taper in diameter at a point preferably near the middle and continues to taper providing a restricted throat area T. From the throat T the diameter of the inner wall of the assembly is preferably enlarged again until it meets cylindrical cooling chamber inner wall 4 which approximately corresponds in size to the diameter of the firing chamber inner wall 2, the cylindrical portion 4 comprising a cooling chamber C. The cooling chamber C continues cylindrically at the same diameter to a point near the discharge end of the cooling chamber C. The end of the assembly at the firing chamber is provided with a tight fitting cap 5. This cap is provided with a cylindrical projection 6 which is of about the same diameter as the inner diameter of the firing chamber wall and extends into the firing chamber a suitable distance. The inlet end of the inner wall 2 of the firing chamber assembly 1 is made sufficiently thick to enable the holes 7 to be drilled into it longitudinally and threaded to accommodate cap screws 8. A series of corresponding clearance holes 9 are drilled into the end cap 5 at the proper radius. The cap is assembled tightly against the firing chamber inner wall 2 when the cap screws 8 are tightened. Leakage from the firing chamber to the outside is prevented by a gasket 10 which is squeezed between the cap 5 and the end of the firing chamber F. The firing chamber inner wall 2 is provided on the outer surface with a series of spiral fins 3 which are integral with the outside surface and arranged to spiral toward the throat section of the chamber. These fins end at a suitable point near the narrowest diameter of the throat and are finished to a close tolerance to insure a snug fit when outer sleeve 11 of the firing chamber assembly is slipped into position over the outside edge of the fins 3. In this manner the firing chamber proper, F, is provided with a spiral channel 12 which completely surrounds the firing chamber wall up to a point 13 which is approximately located at the narrowest portion of the throat T. This outer sleeve 11 is permanently secured to the inner firing chamber wall 2 by any suitable means preferably welding at the two ends, 14 and 15.

The cooling chamber inner wall 4 increases in thickness at the forward end 19, and is preferably integral with the outer sleeve 11 which surrounds the firing chamber inner wall 2. A helix 16 surrounds the inner wall 4 of the cooling chamber C and is secured to it by any suitable means, preferably spot welding. The outer portion of this helix is then finished to a close tolerance to permit the sleeve section 17 to fit over the outer edge of the helix 16 in such a manner to provide a fluid-tight channel 18 surrounding the cooling chamber. The outer sleeve 17 and inner wall 4 enclosing cooling chamber C are attached to each other at the forward end 19 and at the rear 20 by any suitable means preferably welding. When the inner wall 4 of chamber C is welded to the firing chamber inner wall 2, it is preferably finished on its inside surface to conform with the outline of the throat of nozzle T.

Firing chamber F and cooling chamber C, which are interconnected by throat T, together make up a combustion chamber. It will later be appreciated that the firing principally occurs in the chamber F, and the cooling preferably occurs in chamber C, but for convenience in disclosure, the entire central cavity comprising regions F, T, and C will be referred to as the combustion chamber.

At the forward portion of channel 18 there is provided a connection 22 through which water from a supply source 78 (Fig. 9) may be introduced. At a point just before the junction of walls 2 and 4 there are provided a series of holes 21 which are preferably uniformly distributed on a circumferential plane in the wall of the cooling chamber C. These holes create a passageway between the end of spiral conduit 18 and the cooling chamber C. Thus water enters connection 22, spirals through the channel 18 and issues in small streams into the cooling chamber C through holes 21, thereby effectively reducing the temperature of the gases issuing from the throat T into the chamber C.

The rear channel 12 and forward channel 18 are separated from each other by a partition 23 which is integral with the cooling chamber inner wall 4 and the outer shell 11 which surrounds the firing chamber inner wall 2. Taps 24 and 25 are provided at both ends of the helical channel 12. Tap 24 connects the spiral channel 12 to a bore 26 and tap 25 connects with the throat end of the helical channel 12 through bore 27 and through a connecting bore 28.

The fuel employed to operate the motor is preferably introduced through connection 25 and allowed to circulate through channel 12 and issue from the firing chamber cooling spiral 12 through connection 24. From this point the fuel, for example aniline, travels as shown in Fig. 9 through the pump 61, constant pressure valve 72, shutoff valve 96 and safety valve 100 to the fuel inlet connection 29. In this manner the fuel is preheated and the temperature of the walls of the firing chamber is maintained at a workable point since a substantial portion of the heat generated by the combustion is transmitted away from the walls of the firing chamber to the fluid thereby insuring longer life of the firing chamber.

Coupling section 30 is integral with cap 5 and extends on both sides of the cap a substantial distance. It is machined from the point at which it joins the main portion of the cap on the firing chamber side to resemble a truncated cone 32 while on the outer portion of the cap it is cylindrical and provided with threads 33. A hole which extends to within a short distance from the firing chamber but not into it is drilled axially in the center of coupling section 30 from the side opposite the firing chamber. A series of holes 34, preferably 3 in this embodiment, are uniformly spaced on truncated cone section 32 and are drilled perpendicularly to the face of the cone in such a manner that they connect with the end of bore 31. These holes 34 serve as fuel injectors. The face 35 of the cap 5 between the coupling connection 30 and the circumference of the firing chamber inner wall 2 is machined in such a manner as to form an acute angle between the horizontal axis of the cap which passes through the axial bore 31 and the perpendicular cross section of the firing chamber. The opposite face 36 of the cap is machined at an identical angle thereby making the two faces of the cap parallel to each other.

An annular groove 37 is machined perpendicular to the face 36 and extends a sufficient depth into the cap 5. A series of holes 38, preferably 3 in this embodiment are of smaller diameter than the annular groove and are drilled perpendicularly to the face 36 and connect the annular groove 37 with the firing chamber F. The annular groove 37 is covered by an annulus 39 to which is attached a connection nipple 40. This nipple may be attached by any suitable method preferably welding. Nipple 40 is provided with a threaded connection 41 and is drilled axially with a bore 42 in such a manner that it may supply liquid oxidizer to the annular groove 37.

Each pair of bores 38 and 34 is located on the same radius in such a manner that the streams of fuel and oxidizer issuing from each of the holes will intersect at a convenient point P within the firing chamber. While this embodiment employs three pairs of holes the device may be constructed with as many sets of orifices as may be required. Beyond the diameter equivalent to that of the firing chamber the cap is again machined perpendicular to the central axis passing through bore 31 so as to create shoulder 43, which permits the cap to extend a short distance into the firing chamber. From this point out the cap is machined cylindrically with the central axis and is made sufficiently large in diameter to permit a series of clearance holes 9 to be drilled. Cap screws 8 pass through these holes and attach the cap to the assembly 1.

A conduit 45 is attached to the discharge end of cooling chamber C by any suitable means preferably welding. This conduit 45 is provided with a flange 46 which facilitates the union between conduit 45 with the end of cooling chamber C. Conduit 45 leads the cooled gases issuing from chamber C into a series of nozzles 47 which are arranged in a suitable manner to deliver the gases at the proper angle against the blades of a turbine wheel or other impulse device 60 shown in Fig. 9. In the particular embodiment employed in this invention conduit 45 bends through an angle of 90° thereby placing the discharge end of the nozzles at right angles to the axis of the combustion and cooling chambers. Cooling chamber C and conduit assembly 45 are attached to the sides of the impeller housing by bolts passing through holes 49.

A suitable control system by which the combustion apparatus 1 may be operated and regulated is shown in Fig. 9. This comprises a shaft 75, on which are connected turbine 60, pumps 61, 62 and 76, which is placed in rotation by a motor M attached to the shaft at a suitable location and connected to the shaft through a clutch 51.

Fuel from a supply source 70 is drawn into the suction end of pump 61 through conduit 64. A line 66 conducts a portion of the pump discharge to the firing chamber cooling inlet 25 and to a regulating valve 72, while the balance of the discharge is conducted to an apparatus in which it is to be used. The discharge line 66 is divided into two lines by a T connection 68 permitting the stream of fuel to flow through conduit 69 to regulator 72 and through conduit 69a through restriction 73 into the firing chamber cooling connection 25. The fluid discharging from the cooling jacket of the firing chamber F through outlet 24 is conducted by a line 74 and returned at a point 65 into the suction intake of pump 61.

Oxidizer from tank 71 is drawn into the suction end of pump 62 through line 63 and a portion of the oxidizer fluid under pressure is discharged through line 67 to regulator 77 while the balance of the oxidizer passes out the discharge end of pump 62 to the apparatus in which it is to be employed.

Water coolant pump 76 draws the coolant liquid from supply source 78 through suction line 79 and discharges the fluid from pump 76 into a conduit 80. A portion of the fluid entering this line is permitted to pass into line 81 through a cross connection 82. The flow of fluid in line 81 is controlled by a throttle valve 83 which when opened permits the flow of the coolant through restriction 84 into coolant connection 22. On each side of valve 83 and on conduit 81 is a T connection 86 and a cross connection 82. A line 87 conducts fluid from connection 82 to a hydraulically operated cylinder and piston control device 88. The balance of the cooling liquid flows through conduit 80 which conducts the fluid through a hydraulically operated shutoff valve 89, which permits the cooling liquid to flow, when opened, into the T connection 86 and back into line 81 through which it reaches the coolant connection 22.

A portion of the fluid flowing in line 80 is conducted by a T connection 90 into a line 91 in which a check valve 92 is installed. This line 91 connects with a solenoid operated four-way valve 93 which permits the operation of the hydraulic valve control 94. This hydraulic valve control 94 operates through a link and levers 52 the valves 89, 95 and 96 which regulate the flow of coolant, oxidizer, and fuel respectively into the assembly 1. A flow restrictor 97 is preferably placed between the valve 95 and the firing chamber connection 40. Between fuel throttle valve 96 and fuel inlet connection 29 there is another restriction 98. The hydraulically operated control device 88 is connected by proper linkage 99 to a shutoff valve 100. The discharge side of the valve 100 connects directly to the fuel inlet connection 29.

The manner in which the circuit operates is as follows: The shaft 75 on which are attached pumps 61, 62 and 76 and the turbine 60 is rotated by motor M until a suitable speed is reached. At this point pump 76 will be revolving fast enough to place the cooling fluid under sufficient pressure to cause it to flow into lines 80 and 81. The portion of the cooling fluid flowing through line 80 is stopped by the closed valve 89 while the balance of the fluid flows through conduit 80 up to T connection 82 at which point a portion of this fluid stream will continue to flow in line 81 up to the closed throttle valve 83, while the balance of the fluid will flow through line 87 and into the hydraulically operated control device 88 which operates valve 100 through connecting links 99.

Hydraulic control device 88 is counterbalanced by a spring 101 in such a manner that the pressure entering 88 through line 87 must exceed a certain predetermined value before the spring 101 is depressed sufficiently to permit the opening of valve 100. Throttle valve 83 is now manually opened to permit a portion of the flow through line 81 to pass through restriction 84 and into the cooling chamber connection 22 from which point it is allowed to circulate in the jacket section of chamber C and finally enter the cooling chamber C through orifices 21.

Fuel and oxidizer which have been placed under pressure by pumps 61 and 62 respectively flow through lines 66 and 67 through flow control valves 72 and 77 respectively, the fuel passing through flow control regulator 72 and reaching closed valve 96 while the oxidizer passes through flow regulator 77 and reaches closed valve 95. During the starting period the four-way solenoid operated valve 93 connects the hydraulic operating member 94 to line 80 through T connection 90, conduit 91 and check valve 92 in such a manner that the fluid entering hydraulic valve control 94 will enter through connection 102 and maintain the piston 104 of control 94 in such a position that the valves 95, 96 and 89 remain closed. The other side of the piston is open to the vent 105. As soon as coolant pump 76 has generated sufficient pressure to cause the opening of the hydraulic controlled valve 100 a solenoid 106 is energized. For this purpose there is provided a contact 111 carried by a link represented by dotted lines 99 operated by movement of control device 88. This can be accomplished by the closing of contacts 110 and 111 which places solenoid 106 in series with a source of electrical voltage represented, for example, by battery 112. This operates the four-way valve 93 and the valve is turned sufficiently to permit flow of fluid from line 91 into connection 103, of hydraulic valve control 94, permitting piston 104 to be forced to the left while the fluid in the cylinder on the opposing side will leave the chamber through connection 102 and be vented through vent 105. The piston 104 will force the link and lever 52 in the direction of connection 102 thereby permitting the opening of valves 89, 95 and 96. As soon as this occurs the fuel and oxidizer which have already been placed under pressure by the rotation of pumps 61 and 62 will immediately start flowing through the valves and through the restrictions 97 and 98 respectively into the firing chamber through connections 29 and 40, the fuel passing first through the now opened valve 100.

When the fuel and oxidizer come in contact with each other in the firing chamber F of assembly 1 they ignite and generate sufficient gases to continue the revolution of turbine 60. When the fuel and oxidizer are spontaneously combustible materials such as aniline and red fuming nitric acid no ignition device is required as combustion will occur upon contact of the two fluids. But when the propellants are not spontaneously combustible they may be ignited in the usual manner for example by spark plug 113 which may be supplied with voltage by a suitable coil 114. When this turbine has reached sufficient speed the motor M is shut off and the motor is disengaged from shaft 75 by clutch 51. From this time on the pumps are operated by the torque transmitted to the shaft by turbine wheel 60.

Should the pressure in lines 80 and 81 fail for any reason such as breakage in the lines 80 and 81 or pumps 76, or due to any obstructions or failure in the coolant supply system, the pressure in line 87 and against spring 101 of control device 88 will immediately drop causing valve 100 to close. This will discontinue the flow of fuel into firing chamber F and since no fuel is present to react with the oxidizer the entire unit will automatically shut itself down. This precaution is taken because a continued failure to supply cooling liquid to the unit of the assembly 1 would shortly result in injury to the cooling section C and the turbine 60.

The arrangement of my assembly with the throat T located between the two chamber portions and with the injection of the cooling water at the constriction, results in unique and important operating advantages. The injection of the water into the high velocity gas stream issuing through the constriction at the downstream side, creates a homogeneous mixture of the water and water vapor with the gases of combustion. This creates a uniform reduction in temperature throughout the entire cross section of the gaseous stream passing through cooling chamber C thereby substantially equalizing the heat in all portions of the discharge stream thereby preventing the formation of local hot spots.

The introduction of the water at the downstream side of the constriction has the further advantage of enabling the propellants to react or burn completely in the firing chamber F before contact with any of the cooling water. If large amounts of cooling water were injected into the chamber F where the combustion takes place there might be created a serious condition arising from the formation of carbonaceous residues which usually attend the introduction of water into a firing chamber where fuel is being burned. Since all of the burning in my apparatus is completed before the coolant liquid is introduced into the system it is possible to employ any amount of cooling liquid desired without modifying the combustion or interfering in any way with the complete reaction of the fuel and oxidizer.

The control system described in Fig. 9 is particularly advantageous in protecting the apparatus against failure in the coolant supply to the jacket and motor which would result in serious injury to the unit.

I claim:

1. A hydraulically operated system for controlling the flow of fuel into the combustion chamber of a gas turbine having a combustion chamber and an impeller mounted on a shaft, said system comprising pumping means operated by the shaft for placing the fuel, oxidizer and cooling liquid under pressure, conduit means for supplying fuel, oxidizer and cooling liquid to the combustion chamber, a hydraulically operated valve in the fuel line leading to the combustion chamber actuated by pressure developed by the cooling liquid pumping means, said hydraulically operated valve remaining normally closed when the pressure in the cooling liquid line is below a predetermined amount, hydraulically operated valves in the fuel, oxidizer and cooling liquid conduits, a cylinder and a hydraulically operated piston within the cylinder, for opening and closing the said fuel, oxidizer and cooling liquid valves, said piston being movable one way or the other within the cylinder by altering the flow of fluid from one side of the piston to the other in the cylinder, a selective flow valve for controlling the direction of flow of the fluid from one side of the piston to the other, and automatic means for actuating said selective flow valve after the pressure in the cooling liquid line has reached a predetermined value.

2. A hydraulically operated system for controlling the flow of fuel into the combustion chamber of a gas turbine having a combustion chamber and an impeller mounted on a shaft, said system comprising pumping means operated by the shaft for placing the fuel, oxidizer and cooling liquid under pressure, conduit means for supplying fuel and oxidizer to the combustion chamber, conduit means for introducing a stream of cooling liquid at a point in the combustion chamber, and a hydraulically operated valve in the fuel line leading to the combustion chamber actuated by pressure developed by the cooling liquid pumping means, said hydraulically operated valve remaining normally closed when the pressure in the cooling liquid line is below a predetermined amount, hydraulically operated valves in the fuel, oxidizer and cooling liquid conduits, a cylinder and a hydraulically operated piston within the cylinder for opening and closing the said fuel, oxidizer and cooling liquid valves, said piston being movable one way or the other by altering the flow of fluid from one side of the piston to the other in the cylinder, a selective flow valve for controlling the direction of flow of the fluid from one side of the piston to the other, and automatic means for actuating said selective flow valve after the pressure in the cooling liquid line has reached a predetermined value.

3. In a power plant having a combustion chamber and a compartment which receives the products of combustion from the chamber: the combination which comprises a hydraulically operated means for controlling the flow of fuel into said combustion chamber, separate means for introducing fuel and oxidizer into said combustion chamber, and means in association with said hydraulic means for introducing a cooling liquid into the compartment, said hydraulically operated means comprising a pumping means operated by said shaft for placing the fuel, oxidizer and cooling liquid under pressure, conduit means for supplying fuel, oxidizer and cooling liquid to the aforesaid means for introducing fuel and oxidizer into said firing chamber and for introducing a cooling liquid into said compartment, a hydraulically operated valve in the fuel line leading to said combustion chamber actuated by pressure developed by the cooling liquid pumping means, said hydraulically operated valve remaining normally closed when the pressure in the cooling liquid line is below a predetermined amount, hydraulically operated valves in the fuel, oxidizer and cooling liquid conduits, a cylinder and a hydraulically operated piston within the cylinder for opening and closing the said fuel, oxidizer and cooling liquid valve, said piston being movable one way or the other by altering the flow of fluid from one side of said piston to the other in the cylinder, a selective flow valve for controlling the direction of flow of the fluid from one side of the piston to the other, and automatic means for actuating said selective flow valve after the pressure in the cooling liquid line has reached a predetermined valve.

4. In a power plant having a combustion chamber and a compartment which receives the products of combustion from said combustion chamber: the combination which comprises a hydraulically operated means for controlling the flow of fuel into said combustion chamber, separate means for introducing fuel and oxidizer into said combustion chamber, means in association with said last named means for circulating said fuel around said combustion chamber prior to the ignition thereof, water cooling means surrounding said compartment and means for spraying water into said compartment, said hydraulically operated means comprising a pumping means operated by said shaft for placing the fuel, oxidizer and cooling liquid under pressure, conduit means for supplying fuel, oxidizer and cooling liquid to said combustion chamber, a hydraulically operated valve in the fuel line leading to said combustion chamber, said last named valve being actuated by pressure developed by said cooling liquid pumping means, said hydraulically operated valve remaining normally closed when the pressure in said cooling liquid line is below a predetermined amount, hydraulically operated valves in the fuel, oxidizer and cooling liquid conduits, a cylinder and a hydraulically operated piston within the cylinder for opening and closing the said fuel, oxidizer and cooling liquid valves, said piston being movable one way or the other by alternating the flow of fluid from one side of said piston to the other side of said piston in the cylinder, a selective flow valve for controlling the direction of flow of the fluid from one side of the piston to the other, and automatic means for actuating said selective flow valve after the pressure in the cooling liquid line has reached a predetermined value.

References Cited in the file of this patent

UNITED STATES PATENTS

| Number | Name | Date |
|---|---|---|
| 872,039 | Adams | Nov. 26, 1907 |
| 974,457 | Backstrom | Nov. 1, 1910 |
| 1,473,303 | Lightford | Nov. 6, 1923 |
| 1,531,475 | Brandt | Mar. 31, 1925 |
| 1,828,784 | Perrin | Oct. 27, 1931 |
| 1,932,704 | McQuiston | Oct. 31, 1933 |
| 2,010,420 | Simmen | Aug. 6, 1935 |
| 2,010,960 | Pogue | Aug. 13, 1935 |
| 2,225,234 | Schettler | Dec. 17, 1940 |
| 2,365,616 | Zweifel | Dec. 19, 1944 |
| 2,406,926 | Summerfield | Sept. 3, 1946 |
| 2,434,298 | Truax | Jan. 13, 1948 |
| 2,520,751 | Zucrow | Aug. 29, 1950 |